United States Patent
Kraeling et al.

(10) Patent No.: US 10,049,298 B2
(45) Date of Patent: Aug. 14, 2018

(54) VEHICLE IMAGE DATA MANAGEMENT SYSTEM AND METHOD

(71) Applicant: General Electric Company, Schenectady, NY (US)

(72) Inventors: Mark Bradshaw Kraeling, Melbourne, FL (US); Anwarul Azam, Erie, PA (US); Matthew Lawrence Blair, Lawrence Park, PA (US); Shannon Joseph Clouse, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 14/485,398

(22) Filed: Sep. 12, 2014

(65) Prior Publication Data

US 2015/0235106 A1 Aug. 20, 2015

Related U.S. Application Data

(60) Provisional application No. 61/940,696, filed on Feb. 17, 2014, provisional application No. 61/940,813, (Continued)

(51) Int. Cl.
*H04N 7/18* (2006.01)
*G06K 9/62* (2006.01)
(Continued)

(52) U.S. Cl.
CPC .......... *G06K 9/6217* (2013.01); *B61L 23/042* (2013.01); *B61L 23/047* (2013.01); *G06K 9/00791* (2013.01); *H04N 7/181* (2013.01)

(58) Field of Classification Search
CPC ............. G08G 1/00; G08G 17/00; G60F 7/00
(Continued)

(56) References Cited

U.S. PATENT DOCUMENTS 2,701,610 A 2/1955 Carlson
3,505,742 A 4/1970 Fiechter
(Continued)

FOREIGN PATENT DOCUMENTS

CN 201325416 Y 10/2009
CN 201821456 U 5/2011
(Continued)

OTHER PUBLICATIONS

PCT Search Report and Written Opinion issued in connection with corresponding PCT Application No. PCT/US2015/014355 on May 15, 2015.
(Continued)

*Primary Examiner* — Andy Rao
(74) *Attorney, Agent, or Firm* — GE Global Patent Operation; John A. Kramer

(57) ABSTRACT

An image management system includes a controller and one or more analysis processors. The controller is configured to receive search parameters that specify at least one of operational data or a range of operational data of one or more vehicle systems. The one or more analysis processors are configured to search remotely stored image data based on the search parameters to identify matching image data. The remotely stored image data was obtained by one or more imaging systems disposed onboard the one or more vehicle systems, and are associated with the operational data of the one or more vehicle systems that was current when the remotely stored image data was acquired. The one or more analysis processors also are configured to obtain the matching image data having the operational data specified by the search parameters and to present the matching image data to an operator.

21 Claims, 6 Drawing Sheets

Related U.S. Application Data filed on Feb. 17, 2014, provisional application No. 61/940,660, filed on Feb. 17, 2014, provisional application No. 61/940,610, filed on Feb. 17, 2014.

(51) Int. Cl.
*G06K 9/00* (2006.01)
*B61L 23/04* (2006.01)

(58) Field of Classification Search
USPC .................................. 348/112–117, 142–160
See application file for complete search history.

(56) References Cited

U.S. PATENT DOCUMENTS

| | | |
|---|---|---|
| 3,581,071 A | 5/1971 | Payseure |
| 3,641,338 A | 2/1972 | Peel et al. |
| 3,864,039 A | 2/1975 | Wilmarth |
| 4,259,018 A | 3/1981 | Poirier |
| 4,281,354 A | 7/1981 | Conte |
| 4,490,038 A | 12/1984 | Theurer et al. |
| 4,654,973 A | 4/1987 | Worthy |
| 4,751,571 A | 6/1988 | Lillquist |
| 4,783,593 A | 11/1988 | Noble |
| 4,915,504 A | 4/1990 | Thurston |
| 5,203,089 A | 4/1993 | Trefouel et al. |
| 5,337,289 A | 8/1994 | Fasching et al. |
| 5,364,047 A | 11/1994 | Petit et al. |
| 5,379,224 A | 1/1995 | Brown et al. |
| 5,429,329 A | 7/1995 | Wallace et al. |
| 5,506,682 A | 4/1996 | Pryor |
| RE35,590 E | 8/1997 | Bezos et al. |
| 5,659,305 A | 8/1997 | Rains et al. |
| 5,699,057 A | 12/1997 | Ikeda et al. |
| 5,717,737 A | 2/1998 | Doviak et al. |
| 5,729,213 A | 3/1998 | Ferrari et al. |
| 5,735,492 A | 4/1998 | Pace |
| 5,786,750 A | 7/1998 | Cooper |
| 5,793,420 A | 8/1998 | Schmidt |
| 5,867,122 A | 2/1999 | Zahm et al. |
| 5,867,404 A | 2/1999 | Bryan |
| 5,867,717 A | 2/1999 | Milhaupt et al. |
| 5,893,043 A | 4/1999 | Moehlenbrink et al. |
| 5,938,717 A | 8/1999 | Dunne et al. |
| 5,954,299 A | 9/1999 | Pace |
| 5,961,571 A | 10/1999 | Gorr et al. |
| 5,978,718 A | 11/1999 | Kull |
| 6,011,901 A | 1/2000 | Kirsten |
| 6,081,769 A | 6/2000 | Curtis |
| 6,088,635 A | 7/2000 | Cox et al. |
| 6,128,558 A | 10/2000 | Kernwein |
| 6,144,755 A | 11/2000 | Niyogi et al. |
| 6,150,930 A | 11/2000 | Cooper |
| 6,163,755 A | 12/2000 | Peer et al. |
| 6,259,375 B1 | 7/2001 | Andras |
| 6,263,266 B1 | 7/2001 | Hawthorne |
| 6,285,778 B1 | 9/2001 | Nakajima et al. |
| 6,310,546 B1 | 10/2001 | Seta |
| 6,356,299 B1 | 3/2002 | Trosino et al. |
| 6,373,403 B1 | 4/2002 | Korver et al. |
| 6,377,215 B1 | 4/2002 | Halvorson et al. |
| 6,384,742 B1 | 5/2002 | Harrison |
| 6,453,056 B2 | 9/2002 | Laumeyer et al. |
| 6,453,223 B1 | 9/2002 | Kelly et al. |
| 6,487,500 B2 | 11/2002 | Lemelson et al. |
| 6,519,512 B1 | 2/2003 | Haas et al. |
| 6,526,352 B1 | 2/2003 | Breed et al. |
| 6,532,035 B1 | 3/2003 | Saari et al. |
| 6,532,038 B1 | 3/2003 | Haring et al. |
| 6,570,497 B2 | 5/2003 | Puckette et al. |
| 6,600,999 B2 | 7/2003 | Clark et al. |
| 6,631,322 B1 | 10/2003 | Arthur et al. |
| 6,637,703 B2 | 10/2003 | Matheson et al. |
| 6,647,891 B2 | 11/2003 | Holmes et al. |
| 6,712,312 B1 | 3/2004 | Kucik |
| 6,778,284 B2 | 8/2004 | Casagrande |
| 6,831,573 B2 | 12/2004 | Jones |
| 6,995,556 B2 | 2/2006 | Nejikovsky et al. |
| 7,039,367 B1 | 5/2006 | Kucik |
| 7,348,895 B2 | 3/2008 | Lagassey |
| 7,403,296 B2 | 7/2008 | Farritor et al. |
| 7,463,348 B2 | 12/2008 | Chung |
| 7,527,495 B2 | 5/2009 | Yam et al. |
| 7,545,322 B2 | 6/2009 | Newberg et al. |
| 7,571,051 B1 | 8/2009 | Shulman |
| 7,616,329 B2 | 11/2009 | Villar et al. |
| 7,659,972 B2 | 2/2010 | Magnus et al. |
| 7,707,944 B2 | 5/2010 | Bounds |
| 7,742,873 B2 | 6/2010 | Agnew et al. |
| 7,772,539 B2 | 8/2010 | Kumar |
| 7,826,969 B2 | 11/2010 | Hein et al. |
| 7,845,504 B2 | 12/2010 | Davenport et al. |
| 7,908,114 B2 | 3/2011 | Ruggiero |
| 7,965,312 B2 | 6/2011 | Chung et al. |
| 7,999,848 B2 | 8/2011 | Chew |
| 8,180,590 B2 | 5/2012 | Szwilski et al. |
| 8,233,662 B2 | 7/2012 | Bhotika et al. |
| 8,335,606 B2 | 12/2012 | Mian et al. |
| 8,355,834 B2 | 1/2013 | Duggan et al. |
| 8,405,837 B2 | 3/2013 | Nagle, II et al. |
| 8,412,393 B2 | 4/2013 | Anderson et al. |
| 8,576,069 B2 | 11/2013 | Nadeem et al. |
| 8,599,005 B2 | 12/2013 | Fargas et al. |
| 8,649,917 B1 | 2/2014 | Abernathy |
| 8,712,610 B2 | 4/2014 | Kumar |
| 8,744,196 B2 | 6/2014 | Sharma et al. |
| 8,751,073 B2 | 6/2014 | Kumar et al. |
| 8,838,301 B2 | 9/2014 | Makkinejad |
| 8,903,574 B2 | 12/2014 | Cooper et al. |
| 9,041,553 B2 | 5/2015 | Sako et al. |
| 9,049,433 B1 | 6/2015 | Prince |
| 9,108,640 B2 | 8/2015 | Jackson |
| 2001/0050324 A1 | 12/2001 | Greene, Jr. |
| 2002/0003510 A1 | 1/2002 | Shigetomi |
| 2002/0007225 A1 | 1/2002 | Costello et al. |
| 2002/0031050 A1 | 3/2002 | Blevins et al. |
| 2002/0035417 A1 | 3/2002 | Badger et al. |
| 2002/0037104 A1 | 3/2002 | Myers et al. |
| 2002/0041229 A1 | 4/2002 | Satoh et al. |
| 2002/0101509 A1 | 8/2002 | Slomski |
| 2002/0135471 A1 | 9/2002 | Corbitt et al. |
| 2002/0145665 A1 | 10/2002 | Ishikawa et al. |
| 2002/0149476 A1 | 10/2002 | Ogura |
| 2003/0048193 A1 | 3/2003 | Puckette et al. |
| 2003/0142297 A1 | 7/2003 | Casagrande |
| 2003/0202101 A1 | 10/2003 | Monroe et al. |
| 2004/0022416 A1 | 2/2004 | Lemelson et al. |
| 2004/0064241 A1 | 4/2004 | Sekiguchi |
| 2004/0093196 A1 | 5/2004 | Hawthorne et al. |
| 2004/0182970 A1 | 9/2004 | Mollet et al. |
| 2004/0183663 A1 | 9/2004 | Shimakage |
| 2004/0263624 A1 | 12/2004 | Nejikovsky et al. |
| 2005/0012745 A1 | 1/2005 | Kondo et al. |
| 2005/0018748 A1 | 1/2005 | Ringermacher et al. |
| 2005/0110628 A1 | 5/2005 | Kernwein et al. |
| 2005/0113994 A1 | 5/2005 | Bell et al. |
| 2005/0125113 A1 | 6/2005 | Wheeler et al. |
| 2005/0284987 A1 | 12/2005 | Kande et al. |
| 2006/0017911 A1 | 1/2006 | Villar et al. |
| 2006/0132602 A1 | 6/2006 | Muto et al. |
| 2006/0244830 A1 | 11/2006 | Davenport et al. |
| 2007/0005202 A1* | 1/2007 | Breed ............... B60W 50/0205 701/29.1 |
| 2007/0027583 A1* | 2/2007 | Tamir ................. G06Q 30/0283 701/1 |
| 2007/0085703 A1 | 4/2007 | Clark et al. |
| 2007/0170315 A1 | 7/2007 | Manor et al. |
| 2007/0200027 A1 | 8/2007 | Johnson |
| 2007/0216771 A1 | 9/2007 | Kumar |
| 2007/0217670 A1 | 9/2007 | Bar-Am |
| 2007/0284474 A1 | 12/2007 | Olson et al. |
| 2008/0169939 A1 | 7/2008 | Dickens et al. |
| 2008/0304065 A1 | 12/2008 | Hesser et al. |
| 2009/0020012 A1 | 1/2009 | Holten et al. |

(56) References Cited

U.S. PATENT DOCUMENTS

| | | |
|---|---|---|
| 2009/0037039 A1 | 2/2009 | Yu et al. |
| 2009/0144233 A1 | 6/2009 | Grigsby et al. |
| 2009/0189981 A1 | 7/2009 | Siann et al. |
| 2009/0314883 A1 | 12/2009 | Arlton et al. |
| 2010/0026551 A1 | 2/2010 | Szwilski et al. |
| 2010/0039514 A1 | 2/2010 | Brand |
| 2010/0049405 A1 | 2/2010 | Li |
| 2010/0060735 A1 | 3/2010 | Sato |
| 2010/0066527 A1 | 3/2010 | Liou |
| 2010/0073480 A1 | 3/2010 | Hoek et al. |
| 2010/0207787 A1 | 8/2010 | Catten et al. |
| 2010/0253541 A1 | 10/2010 | Seder et al. |
| 2010/0283837 A1 | 11/2010 | Oohchida et al. |
| 2011/0064273 A1 | 3/2011 | Zarembski et al. |
| 2011/0115913 A1 | 5/2011 | Lang et al. |
| 2011/0216200 A1 | 9/2011 | Chung et al. |
| 2011/0285842 A1 | 11/2011 | Davenport et al. |
| 2012/0089537 A1 | 4/2012 | Cooper et al. |
| 2012/0192756 A1 | 8/2012 | Miller et al. |
| 2012/0263342 A1 | 10/2012 | Haas et al. |
| 2012/0274772 A1 | 11/2012 | Fosburgh et al. |
| 2012/0300060 A1 | 11/2012 | Farritor |
| 2013/0018766 A1 | 1/2013 | Christman |
| 2013/0116972 A1 | 5/2013 | Hanatsuka et al. |
| 2013/0191070 A1 | 7/2013 | Kainer et al. |
| 2013/0233964 A1 | 9/2013 | Woodworth et al. |
| 2013/0286204 A1 | 10/2013 | Cheng |
| 2014/0003724 A1 | 1/2014 | Feris et al. |
| 2014/0012438 A1 | 1/2014 | Shoppa et al. |
| 2014/0036063 A1 | 2/2014 | Kim et al. |
| 2014/0036076 A1 | 2/2014 | Nerayoff et al. |
| 2014/0067167 A1 | 3/2014 | Levien et al. |
| 2014/0071269 A1 | 3/2014 | Mohamed et al. |
| 2014/0129154 A1 | 5/2014 | Cooper et al. |
| 2014/0142868 A1 | 5/2014 | Bidaud |
| 2014/0266882 A1 | 9/2014 | Metzger |
| 2014/0300738 A1 | 10/2014 | Mueller |
| 2015/0269841 A1 | 9/2015 | Makowitz et al. |
| 2016/0006922 A1 | 1/2016 | Boudreau et al. |

FOREIGN PATENT DOCUMENTS

| | | |
|---|---|---|
| DE | 19529986 A1 | 2/1997 |
| DE | 19938267 A1 | 2/2001 |
| DE | 102005029956 A1 | 2/2006 |
| EP | 0093322 A2 | 11/1983 |
| EP | 0117763 A2 | 9/1984 |
| EP | 0378781 A1 | 7/1990 |
| EP | 0605848 A1 | 7/1994 |
| EP | 0761522 A1 | 3/1997 |
| EP | 0893322 A1 | 1/1999 |
| EP | 1236634 A1 | 9/2002 |
| EP | 953491 B1 | 12/2005 |
| EP | 1600351 B1 | 1/2007 |
| GB | 2384379 A | 7/2003 |
| GB | 2403861 A | 1/2005 |
| KR | 20130119633 A | 11/2013 |
| KR | 20140017735 A | 2/2014 |
| WO | 02058984 A1 | 8/2002 |
| WO | 2006112959 A2 | 10/2006 |
| WO | 2007096273 A1 | 8/2007 |
| WO | 2012150591 A2 | 11/2012 |
| WO | 2013086578 A1 | 6/2013 |
| WO | 2013121344 A2 | 8/2013 |

OTHER PUBLICATIONS

PCT Search Report and Written Opinion issued in connection with corresponding PCT Application No. PCT/US2015/016151 on May 27, 2015.

Nicholls et al., "Applying Visual Processing to GPS Mapping of Trackside Structures," Proc. 9th British Machine Vision Conference, Southampton, pp. 841-851, 1998.

Saab A Map Matching Approach for Train Positioning Part I: Development and Analysis, IEEE Transactions on Vehicular Technology, vol. No. 49, Issue No. 2, pp. 467-475, Mar. 2000.

Oertel et al., "A Video-Based Approach for Stationary Platform Supervision", Intelligent Transportation Systems, 2002 Proceedings of IEEE 5th International Conference, pp. 892-897, 2002.

Stella et al., "Visual Recognition of Missing Fastening Elements for Railroad Maintenance", Intelligent Transportation Systems, The IEEE 5th International Conference, pp. 94-99, 2002.

Kim et al., "Pseudo-Real Time Activity Detection for Railroad Grade Crossing Safety", Intelligent Transportation Systems Proceedings of IEEE, vol. No. 2, pp. 1355-1361, 2003.

Hirokawa et al., "Threading the Maze," GPS World, pp. 20-26, Nov. 2004.

U.S. Non-Final Office Action issued in connection with related U.S. Appl. No. 10/361,968 dated Aug. 30, 2006.

PCT Search Report and Written Opinion issued in connection with related PCT Application No. PCT/US2005/039829 dated Mar. 22, 2007.

U.S. Final Office Action issued in connection with related U.S. Appl. No. 10/361,968 dated Apr. 24, 2007.

Eden et al., "Using 3d Line Segments for Robust and Efficient Change Detection from Multiple Noisy Images", Computer Vision-ECCV 2008, Springer Berlin Heidelberg, pp. 172-185, 2008.

PCT Search Report and Written Opinion issued in connection with related PCT Appication No. PCT/US2007/068780 dated Jan. 2, 2008.

PCT Search Report and Written Opinion issued in connection with related PCT Application No. PCT/US2008/061478 dated Jul. 24, 2008.

Unofficial English Translation of Mexican Office Action issued in connection with related MX Application No. 2003/004888 dated Sep. 10, 2008.

Zerbst et al., "Damage Tolerance Investigations on Rails", Engineering Fracture Mechanics, vol. No. 76, Issue No. 17, pp. 2637-2653, 2009.

Rahmani et al., "A Novel Network Design for Future IP-Based Driver Assistance Camera Systems", Networking, Sensing and Control, 2009. ICNSC '09. International Conference on, IEEE Xplore, pp. 457-462, Mar. 2009.

European Office Action issued in connection with related EP Application No. 07783663.3 dated Jun. 10, 2009.

Kaleli et al., "Vision-Based Railroad Track Extraction Using Programming", Proc. of the 12th Inter. IEEE Conf. on Intelligent Transportation Systems, pp. 42-47, 2009.

Oh et al., "Performance Analysis of Vision Based Monitoring System for Passenger's Safety on Railway Platform", Control Automation and Systems (ICCAS), 2010 International Conference, pp. 1867-1870, 2010.

Rutzinger et al., "Change Detection of Building Footprints from Airborne Laser Scanning Acquired in Short Time Intervals", pp. 475-480, Jul. 5, 2010.

Unofficial English Translation of Chinese Office Action issued in connection with related CN Application No. 200780024969.0 dated Jul. 26, 2010.

U.S. Non-Final Office Action issued in connection with related U.S. Appl. No. 11/146,831 dated Sep. 21, 2010.

Masuko et al., "Autonomous Takeoff and Landing of an Unmanned Aerial Vehicle", System Integration (SII), 2010 EEE/SICE International Symposium on, pp. 248-253, Dec. 21-22, 2010.

U.S. Non-Final Office Action issued in connection with related U.S. Appl. No. 11/479,559 dated Feb. 3, 2011.

U.S. Non-Final Office Action issued in connection with related U.S. Appl. No. 11/750,681 dated May 18, 2011.

Guofang et al.,"Research on Real-Time Location-Tracking of Underground Mine Locomotive Based on Wireless Mobile Video", Mechatronic Science, Electric Engineering and Computer (MEC), 2011 International Conference on, IEEE Xplore, pp. 625-627, Aug. 19-22, 2011.

U.S. Final Office Action issued in connection with related U.S. Appl. No. 11/479,559 dated Aug. 16, 2011.

U.S. Final Office Action issued in connection with related U.S. Appl. No. 11/750,681 dated Oct. 14, 2011.

(56) References Cited

OTHER PUBLICATIONS

Li et al., "A Real-Time Visual Inspection System for Discrete Surface Defects of Rail Heads", IEEE Transactions on Instrumentation and Measurement, vol. No. 61, Issue No. 8, pp. 2189-2199, 2012.

U.S. Non-Final Office Action issued in connection with related U.S. Appl. No. 13/194,517 dated Dec. 19, 2012.

Stent et al., "An Image-Based System for Change Detection on Tunnel Linings", 13th IAPR International Conference on Machine Vision Applications, 2013.

U.S. Final Office Action issued in connection with related U.S. Appl. No. 13/194,517 dated Jul. 15, 2013.

PCT Search Report and Written Opinion issued in connection with related PCT Application No. PCT/US2015/013720 dated Apr. 28, 2015.

PCT Search Report and Written Opinion issued in connection with related PCT Application No. PCT/US2015/013735 dated May 1, 2015.

U.S. Non-Final Office Action issued in connection with related U.S. Appl. No. 14/479,847 dated Jun. 10, 2015.

U.S. Non-Final Office Action issued in connection with related U.S. Appl. No. 14/479,847 dated Nov. 18, 2015.

U.S. Non-Final Office Action issued in connection with related U.S. Appl. No. 14/253,294 dated Dec. 30, 2015.

U.S. Non-Final Office Action issued in connection with related U.S. Appl. No. 14/479,847 dated Apr. 21, 2016.

European Search Report and Opinion issued in connection with related EP Application No. 15184083.2 dated Jun. 16, 2016.

U.S. Final Office Action issued in connection with related U.S. Appl. No. 14/253,294 dated Jul. 14, 2016.

U.S. Non-Final Office Action issued in connection with related U.S. Appl. No. 14/217,672 dated Jul. 15, 2016.

U.S. Appl. No. 14/479,847, filed Sep. 8, 2014, Nidhi Naithani et al.

U.S. Appl. No. 14/217,672, filed Mar. 18, 2014, Nidhi Naithani et al.

U.S. Appl. No. 14/541,370, filed Nov. 14, 2014, Mark Bradshaw Kraeling et al.

U.S. Appl. No. 14/624,069, filed Feb. 17, 2015, Brad Thomas Costa et al.

U.S. Appl. No. 14/884,233, filed Oct. 15, 2015, Aadeesh Shivkant Bhagwatkar et al.

U.S. Appl. No. 61/940,610, filed Feb. 17, 2014, Mark Bradshaw Kraeling et al.

U.S. Appl. No. 14/457,353, filed Aug. 12, 2014, Mark Bradshaw Kraeling et al.

U.S. Appl. No. 14/253,294, filed Apr. 15, 2014, Nidhi Naithani et al.

U.S. Appl. No. 10/361,968, filed Feb. 10, 2003, Jeffrey James Kisak et al.

U.S. Appl. No. 11/479,559, filed Jun. 30, 2006, David M. Davenport et al.

U.S. Appl. No. 11/750,681, filed May 18, 2007, Ajith Kuttannair Kumar.

U.S. Non-Final Office Action issued in connection with related U.S. Appl. No. 14/457,353 dated Nov. 3, 2016.

* cited by examiner

VEHICLE IMAGE DATA MANAGEMENT SYSTEM AND METHOD

CROSS-REFERENCE TO RELATED APPLICATIONS

This application claims priority to U.S. Provisional Application No. 61/940,696, which was filed on 17 Feb. 2014, and is titled "Vehicle Image Data Management System And Method" (the "'696 Application"), to U.S. Provisional Application No. 61/940,813, which was filed on 17 Feb. 2014, and is titled "Portable Camera System And Method For Transportation Data Communication" (the "'813 Application"), to U.S. Provisional Application No. 61/940,660, which was filed on 17 Feb. 2014, and is titled "Route Imaging System And Method" (the "'660 Application"), and to U.S. Provisional Application No. 61/940,610, which was filed on 17 Feb. 2014, and is titled "Wayside Imaging System And Method" (the "'610 Application"). The entire disclosures of these applications (the '696 Application, the '813 Application, the '660 Application, and the '610 Application) are incorporated by reference herein.

FIELD

Embodiments of the subject matter described herein relate to imaging systems, such as imaging systems onboard or near vehicle systems.

BACKGROUND

Vehicle systems such as trains or other rail vehicles can include cameras disposed on or near the vehicle systems. These cameras can be used to record actions occurring outside of the vehicle systems. For example, forward facing cameras can continuously record video of the locations ahead of a train. If a collision between the train and another vehicle occurs (e.g., an automobile is struck at a crossing), then this video can later be reviewed to determine liability for the collision, whether the other vehicle improperly moved through a gate or signal, whether the train was moving too fast, or the like. But, the image data obtained by these cameras typically is only saved on a temporary loop. Older image data is discarded when no accidents occur, even though this image data may represent one or more other problems with the vehicle and/or track.

Additionally, in order to inspect the image data, some known systems are limited to requiring an operator to review large portions of the image data to find one or more smaller sections of interest in the image data. For example, the image data acquired over a long trip may be reviewed by an operator in an attempt to find the segment of this image data that may have captured a video or image of a signal on which the operator wants to check. Searching through this entire image data can be time intensive.

Multiple vehicle systems may include multiple cameras, all capturing image data. But, this data across the multiple vehicle systems is not correlated with each other, such that it is difficult for operators to find all portions of the image data that may include video or images of a certain location that the vehicle systems moved past.

Finally, the image data acquired by the vehicle systems usually is stored onboard the vehicle systems. As a result, the image data may not be accessible to a remotely located operator until the vehicle system ends a current trip and is at a location where the vehicle system can upload or otherwise send the image data to the operator.

BRIEF DESCRIPTION

In one example of the inventive subject matter, a system (e.g., an image management system) includes a controller and one or more analysis processors. The controller and the one or more analysis processors may be embodied in a single processor, or may be embodied in two or more processors. For example, the controller may include one or more microprocessors, and/or hardware circuits or circuitry that include and/or are connected with one or more microprocessors, and the one or more processors may be software modules executed by the controller.

The controller can be configured to receive search parameters, the search parameters specifying at least one of operational data or a range of the operational data of one or more vehicle systems. The one or more analysis processors are configured to search remotely stored image data based on the search parameters to identify matching image data. The remotely stored image data is obtained by one or more imaging systems disposed onboard the one or more vehicle systems. The remotely stored image data is associated with the operational data of the one or more vehicle systems that was current when the remotely stored image data was acquired. The one or more analysis processors also are configured to obtain the matching image data having the operational data specified by the search parameters and to present the matching image data to an operator.

In another embodiment, a method (e.g., an image management method) includes receiving search parameters that specify at least one of operational data or a range of the operational data of one or more vehicle systems and searching (with one or more processors) remotely stored image data based on the search parameters to identify matching image data. The remotely stored image data can be obtained by one or more imaging systems disposed onboard the one or more vehicle systems, and can be associated with the operational data of the one or more vehicle systems that was current when the remotely stored image data was acquired. The method also can include obtaining the matching image data having the operational data specified by the search parameters to present the matching image data to an operator.

In another embodiment, another method (e.g., another image management method) includes acquiring first image data from one or more cameras disposed onboard a vehicle system as the vehicle system moves along a route. The image data represents at least one of images or videos of a field of view of the one or more cameras. The method also may include determining operational data of the vehicle system when the first image data was acquired. The operational data includes at least one of operational settings of the vehicle system when the first image data was acquired and/or operational conditions to which the vehicle system is exposed when the first image data was acquired. The method also can include associating the operational data with the first image data, identifying one or more segments of the first image data as matching image data responsive to receiving search parameters that specify at least some of the operational data associated with the first image data, and communicating the matching image data to an off-board location responsive to identifying the matching image data.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
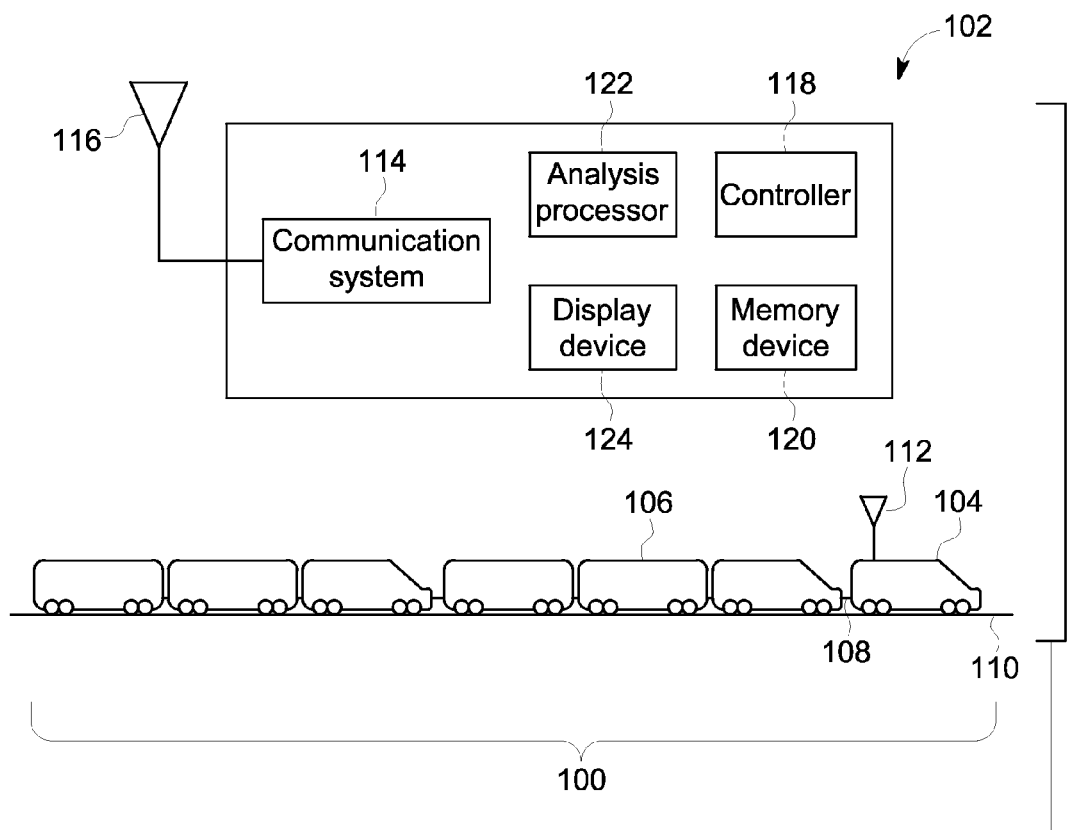
FIG. 1 is a schematic illustration of a vehicle system and a vehicle image data management system according to one example of the inventive subject matter.

One or more embodiments of the inventive subject matter described herein relate to imaging systems and methods for vehicle systems. While several examples of the inventive subject matter are described in terms of rail vehicles (e.g., trains, locomotive, locomotive consists, and the like), not all embodiments of the inventive subject matter are limited to rail vehicles. At least some of the inventive subject matter may be used in connection with other off-highway vehicles (e.g., vehicles that are not permitted or designed for travel on public roadways, such as mining equipment), automobiles, marine vessels, airplanes, or the like.

In one aspect of the subject matter described herein, vehicle systems acquire image data representative of actions and objects in a field of view of one or more cameras of the vehicle systems. The cameras can be internal cameras located inside the vehicle systems, such as inside cabs of the vehicle systems where operators of the vehicle systems are located to control operations of the vehicle systems. These cameras can monitor and record the actions of the operator to assist in accident reconstruction, to provide evidence of liability in an accident, to ensure the operator is present and performing appropriate tasks, or the like. Optionally, the cameras can include external cameras mounted to exterior surfaces of the vehicle systems. The field of view of the cameras (internal or external) can capture events or objects disposed outside of the vehicle systems. For example, the field of view of an internal camera can encompass objects disposed alongside a route being traveled by the vehicle system via a window or opening of the vehicle system.

The image data that is acquired and output by the cameras can be locally saved in memory devices of the vehicle systems. The image data can be embedded or otherwise associated with operational data of the vehicle system in which or on which the camera is disposed. This operational data represents operational conditions and/or operational settings of the vehicle system, as described below.

The image data acquired by one or more of the vehicle systems may be remotely accessed by one or more locations that are off-board the vehicle systems that acquired the image data. For example, an off-board facility such as a dispatch facility, repair station, refueling station, scheduling facility, another vehicle system (that did not acquire the image data), or the like, can obtain access to and view the image data stored onboard the vehicle systems that acquired the image data. The off-board facility can filter through the image data acquired by one or more vehicle systems using the operational data to find certain segments of the image data that are or were obtained at or near a location of interest to an operator at the off-board facility. For example, from an off-board facility, the operational data may be used to search through the image data stored remotely on one or more vehicle systems to find image data that was obtained at or near the location of a signal that has been identified as potentially having a burned out bulb in a light of the signal, to find image data obtained at or near a reported rock slide, or the like. The off-board facility may then identify relevant image data relatively quickly in order to determine one or more responsive actions to take. Otherwise, the off-board facility may be forced to wait until the vehicle systems that traveled near the location of interest return to a location where the image data is downloaded and/or communicated to the off-board facility, where one or more operators may then need to sift through (e.g., view) lengthy files of image data in an attempt to find the image data acquired at or near the location of interest.

FIG. 1 is a schematic illustration of a vehicle system 100 and a vehicle image data management system 102 according to one example of the inventive subject matter. The vehicle system 100 includes several propulsion-generating vehicles 104 and several non-propulsion-generating vehicles 106 mechanically coupled with each other, such as by couplers 108. The vehicles 104, 106 can be coupled with each other to travel along a route 110 together as a consist, such as a vehicle consist or rail vehicle consist. The number and/or arrangement of the vehicles 104, 106 in the vehicle system 100 may vary from the embodiment shown in FIG. 1. In one example, the vehicles 104, 106 are rail vehicles, such as locomotives and rail cars, but optionally may be another type of vehicle, such as another off-highway vehicle (e.g., vehicles that are not designed or permitted for travel on public roads), an automobile, a marine vessel, an airplane, or the like. The vehicle system 100 alternatively may be formed from a single vehicle, such as a single locomotive, a single other off-highway vehicle, a single automobile, a single marine vessel, a single airplane, or the like.

As described below, one or more of the vehicles 104, 106 include an imaging system that generates image data representative of images and/or video captured by a camera disposed onboard (e.g., inside and/or external to the vehicles 104, 106). The image data can be communicated between the vehicle system 100 and an off-board facility where the management system 102 is located. For example, the vehicle system 100 and the management system 102 can include communication systems 112, 114 that permit the vehicle system 100 and the management system 102 to wirelessly communicate the image data. Optionally, the image data can be communicated through one or more wired connections, such as by conducting electric signals through rails, catenaries, power lines, or the like, between the vehicle system 100 and the management system 102.

The management system 102 can be located at a stationary building, such as a dispatch facility, scheduling facility, repair facility, refueling facility, or the like. Optionally, the management system 102 may be located at a mobile location, such as another vehicle system or another vehicle 104, 106 of the same vehicle system 100 that generated the image data, and/or in a laptop computer or other portable computer that is configured to communicate via a wireless network and/or via a wired connection (e.g., via an Ethernet connection).

The management system 102 includes the communication system 114 referred to above, which includes hardware circuits or circuitry that include and/or are connected with one or more computer processors (e.g., microprocessors) and communication devices (e.g., a wireless antenna 116 and/or one or more wired connections described above) that operate as transmitters and/or transceivers for communicating signals with the communication system 112 of the vehicle system 100. For example, the communication system 114 may wirelessly communicate (e.g., receive) signals that include image data via the antenna 116 and/or communicate the signals over the wired connection from the vehicle system 100 that acquired and/or locally stores the image data.

A controller 118 of the management system 102 includes or represents hardware circuits or circuitry that includes and/or is connected with one or more computer processors, such as one or more computer microprocessors. The controller 118 can be used to control operations of the management system 102, such as by receiving input from an operator of the management system 102 to search for image data that illustrates a location of interest (e.g., a location being investigated by the operator), image data acquired when certain operational conditions were present at the vehicle system 100, image data acquired when certain operational settings were used in the vehicle system 100, or the like.

A memory device 120 of the management system 102 includes one or more computer readable media used to at least temporarily store the image data obtained from one or more of the vehicle systems 100. Without limitation, the memory device 120 can include a computer hard drive, flash drive, optical disk, or the like. An analysis processor 122 of the management system 102 includes hardware circuits and/or circuitry that include and/or are connected with one or more computer processors, such as one or more computer microprocessors. The analysis processor 122 receives the input provided by the operator to search for and obtain certain segments of the image data acquired by the imaging system of one or more vehicle systems 100. For example, the operator of the management system 102 can provide certain search parameters, such as location, time, date, operational settings, operational conditions, or the like, and the analysis processor 122 can search through the image data stored remotely onboard the one or more vehicle systems 100, stored locally in the memory device 120, and/or elsewhere, to find one or more segments of image data having operational data that matches the search parameters (or at least more closely matches the search parameters than one or more other segments of the image data). The image data that is found through this search may include image data acquired by different vehicle systems 100. The image data having operational data that matches or more closely matches the search parameters than other image data can be referred to herein as matching image data.

The analysis processor 122 can relay the matching image data to a display device 124. The display device 124 may be a monitor, television, touchscreen, or other output device that visually presents the matching image data. The operator can use the controller 118 to control presentation of the matching image data.

In one aspect, the image data is stored remotely from the analysis processor 122, such as onboard one or more of the vehicle systems 100. The image data can be stored on the vehicle systems 100 in such a way that the image data is associated with operational data described herein. For example, the operational data may be embedded, modulated into, or otherwise included in the same electronic files that include the image data. In one aspect, the operational data can be stored in the image data as metadata of the image data. Alternatively, the operational data can be separately stored from the electronic files that include the image data, but associated with the image data. For example, one or more tables, lists, file pointers, databases, or the like, can be used to associate different operational data with different image data so that, when operational data is found to match the search parameters, the image data associated with, but separately stored from, this operational data can then be retrieved for presentation on the display device 124.

Figure 2:
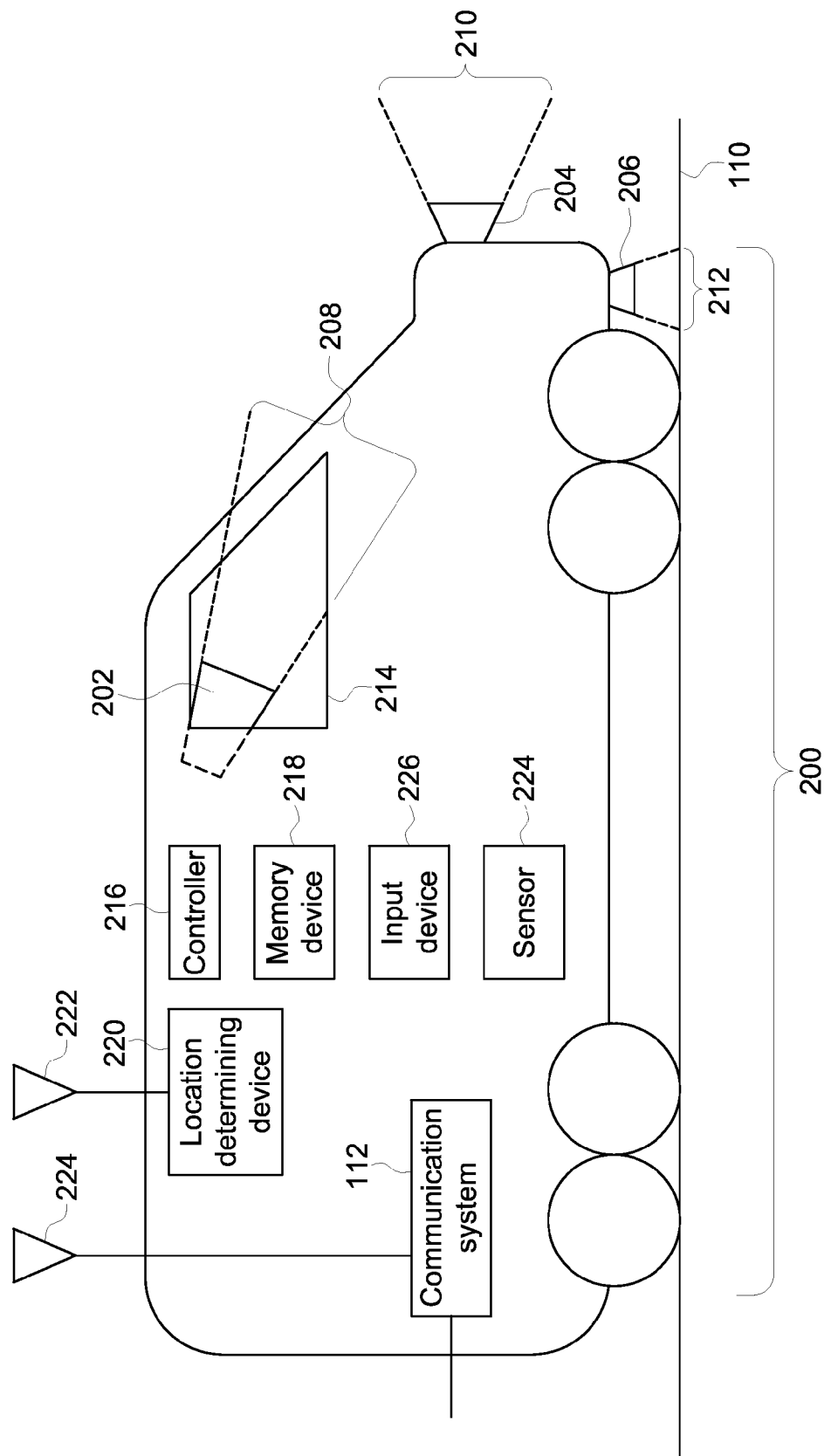
FIG. 2 is a schematic diagram of an imaging system disposed onboard a vehicle of the vehicle system shown in FIG. 1 according to one example of the inventive subject matter described herein.

FIG. 2 is a schematic diagram of an imaging system 200 disposed onboard a vehicle 104 of the vehicle system 100 shown in FIG. 1 according to one example of the inventive subject matter described herein. Optionally, the imaging system 200 can be disposed onboard another vehicle 104, 106 of the vehicle system 100. In the illustrated example, the imaging system 200 includes cameras 202, 204, 206 that output image data representative of objects and/or actions occurring within fields of view 208, 210, 212 of the respective cameras 202, 204, 206. Optionally, a different number and/or arrangement of the cameras may be included in the imaging system 200. The field of view for each camera represents the space that is imaged or otherwise represented by image data generated by that camera.

The camera 202 may be referred to as an internal camera or cab camera because the camera 202 is disposed inside a cab of the vehicle 104 where an operator of the vehicle 104 is located to control and/or monitor operations of the vehicle 104. The camera 202 can be positioned and oriented so that the field of view 208 of the camera 202 includes the interior space of the cab in the vehicle 104, as well as a portion of the exterior of the vehicle 104. This portion of the exterior of the vehicle 104 can be the space outside of the vehicle 104 that is viewable through one or more windows 214 of the vehicle 104. In the illustrated example, the camera 202 is oriented so that at least a portion of the route 110 that is ahead of the vehicle 104 is viewable in the field of view 208 of the camera 202.

The camera 204 may be referred to as an external or exterior camera because the camera 204 is outside of the vehicle 104. The field of view 210 of the camera 204 is oriented ahead of the vehicle 104, but optionally may be oriented in another direction. The camera 206 can be referred to as a route monitoring camera because the field of view 212 of the camera 206 includes the route 110. The image data provided by the camera 206 can be used to inspect the route 110.

The route 110, one or more wayside devices (e.g., equipment, systems, assemblies, and the like, that are located outside of the vehicle system 100 at, near, or alongside the route 110), actions of an onboard operator, and other objects may be imaged by the cameras 202, 204, 206 during travel of the vehicle 104. The images and/or video captured and output by the cameras 202, 204, 206 can be referred to herein as image data.

One or more of the cameras 202, 204, 206 may be a digital camera capable of obtaining relatively high quality image data (e.g., static or still images and/or videos). For example, one or more of the cameras 202, 204, 206 may be Internet protocol (IP) cameras that generate packetized image data. One or more of the cameras 202, 204, 206 can be a high definition (HD) camera capable of obtaining image data at relatively high resolutions. For example, one or more of the cameras 202, 204, 206 may obtain image data having at least 480 horizontal scan lines, at least 576 horizontal scan lines, at least 720 horizontal scan lines, at least 1080 horizontal scan lines, or an even greater resolution. The image data generated by the cameras 202, 204, 206 can include still images and/or videos.

A controller 216 of the vehicle 104 includes hardware circuits or circuitry that includes and/or is connected with one or more computer processors, such as one or more computer microprocessors. The controller 216 is used to autonomously and/or manually control operations of the vehicle 104 and/or vehicle system 100. For example, the controller 112 may receive inputs from one or more input devices 226, such as one or more levers, pedals, buttons, switches, touchscreen, keyboards, styluses, or the like. The inputs may be used by the controller 216 to change throttle settings, brake settings, or the like, of the vehicle 104 and/or vehicle system 100.

The controller 216 can report at least some of the operational settings of the vehicle 104 and/or vehicle system 100 to an onboard memory device 218 and/or the camera 202, 204, and/or 206 so that the operational settings can be stored with the image data as operational data. For example, the throttle settings, brake settings, amount of fuel and/or electric energy that is onboard the vehicle 104 and/or vehicle system 100, the amount of fuel and/or electric energy consumed by the vehicle 104 and/or vehicle system 100, or the like, can be embedded in the image data or otherwise associated with the image data. The operational settings that are current (e.g., the settings being used at the same time that the image data is obtained) may be embedded in or otherwise associated with the image data in the memory device 218. For example, the brake setting being used to propel the vehicle 104 at the same that image data is generated by the camera 204 may be embedded in the image data.

The memory device 218 includes one or more computer readable media used to store the image data provided by the one or more of the cameras 202, 204, 206 and/or the operational data associated with the image data. Without limitation, the memory device 218 can include a computer hard drive, flash drive, optical disk, or the like. The memory device 218 may be disposed entirely onboard the vehicle 104, or may be at least partially stored off-board the vehicle 104.

As described above, operational data that is included in or otherwise associated with the image data can include operational conditions. Operational conditions represent the state of the conditions in and/or around the vehicle 104 and/or vehicle system 100. Examples of operational conditions include a date, time, location of the vehicle 104 and/or vehicle system 100, acceleration of the vehicle 104 and/or vehicle system 100, vibrations of the vehicle 104 and/or vehicle system 100, forces exerted on the couplers 108 (shown in FIG. 1), the speed of the vehicle 104 and/or vehicle system 100, the temperature inside and/or outside of the vehicle 104 and/or vehicle system 100, forces experienced by the vehicle 104 and/or vehicle system 100, emissions generated by the vehicle 104 and/or vehicle system 100, and the like.

Various components of the vehicle 104 and/or vehicle system 100 can provide the operational data for storage in or association with the image data. For example, the controller 216 can include an internal clock or otherwise determine the date and/or time at which image data is acquired. This date and/or time can be stored in or associated with the image data acquired at the date and/or time. A location determining device 220 generates operational data representative of where the vehicle 104 and/or vehicle system 100 is located when image data is obtained. The location determining device 220 can represent a global positioning system (GPS) receiver, a radio frequency identification (RFID) transponder that communicates with RFID tags or beacons disposed alongside the route 110, a computer that triangulates the location of the vehicle 104 and/or vehicle system 100 using wireless signals communicated with cellular towers or other wireless signals, a speed sensor (that outputs data representative of speed, which is translated into a distance from a known or entered location by the controller 216), or the like. The location determining device 220 can include an antenna 222 (and associated hardware receiver or transceiver circuitry) for determining the location. The location of the vehicle 104 and/or vehicle system 100 can be embedded in or otherwise associated with the image data acquired at that location.

One or more sensors 224 can generate operational data representative of operational conditions of the vehicle 104 and/or vehicle system 100 for storage in or association with the image data. For example, the sensors 224 can include accelerometers that measure acceleration, vibrations, or forces exerted on the vehicle 104 and/or vehicle system 100. The sensors 224 can include force sensors that measure or estimate forces exerted on the couplers 108 (shown in FIG. 1). The sensors 224 can include speed sensors that measure the speed of the vehicle 104 and/or vehicle system 100. The sensors 224 can include thermometers that measure the temperature inside and/or outside of the vehicle 104 and/or vehicle system 100. The sensors 224 can include gas sensors (e.g., $CO_2$ sensors, oxygen sensors, or the like) that measure emissions generated by the vehicle 104 and/or vehicle system 100. Optionally, the sensors 224 can include one or more other sensors that measure operating conditions of the vehicle 104 and/or vehicle system 100.

The operational data generated by the sensors 224 can be stored with the image data to indicate the operational conditions when the image data was obtained. For example, the location of the vehicle 104 and/or vehicle system 100 when the image data was obtained, the time and/or date when the image data was obtained, or the like, can be stored in or otherwise associated with the image data in the memory device 218.

The image data and embedded or otherwise associated operational data can be accessible by the remotely located management system 102 (shown in FIG. 1) via the communication system 112 of the vehicle 104 (or another communication system 112 of the vehicle system 100). The communication system 112 includes hardware circuits or circuitry that include and/or are connected with one or more computer processors (e.g., microprocessors) and communication devices (e.g., a wireless antenna 224 and/or one or more wired connections described above) that operate as transmitters and/or transceivers for communicating signals with the communication system 114 of the management system 102. For example, the communication system 112 may wirelessly communicate (e.g., transmit and/or broadcast) signals that include image data and the operational data via the antenna 224 and/or communicate the signals over a wired connection.

In operation, the management system 102 permits an operator to provide search parameters to search for segments of interest in the image data obtained by one or more of the vehicle systems 100, to remotely access the matching image data (e.g., from the memory devices 218 on the vehicle systems 100 via the communication systems 112, 114), and to present the matching image data to the operator on the display device 124. For example, the operator of the management system 102 can specify a date and/or time, and the management system 102 reviews the operational data associated with the image data to find the image data that was acquired at the specified date and/or time. In one embodiment, the management system 102 can review the operational data stored in the remotely located memory devices 218 of the vehicle systems 100. Alternatively, the operational data can be stored in the memory device 120 (shown in FIG. 1) of the management system 102. This operational data can be stored in the memory device 120 with additional information that associates the operational data with different image data. For example, file pointers or other indicators that notify the management system 102 which operational data corresponds to the settings and/or conditions that were in place when the image data was acquired may be stored in the memory device 120 with or without the operational data.

In one embodiment, the use of digital cameras 202, 204, 206 allows for digital storage of the image data in digital files saved in the onboard memory device 218. The files may be randomly accessible in one aspect. The operational data that is embedded in or otherwise associated with the files can be available both in the vehicle system 100 and the remotely located management system 102. For example, the vehicle 104 may include a display device similar to the display device 124 of the management system 102. An onboard operator of the vehicle 104 can use the controller 216 to input search parameters to search for image data having or associated with operational data that matches or otherwise corresponds to the search parameters, and to view the matching image data onboard the vehicle 104 or another vehicle of the vehicle system 100.

The management system 102 can be used by a remote fleet control and operations center (e.g., facility that monitors and/or controls movements of multiple vehicle systems 100) can remotely obtain image data of interest from the imaging systems 200 of the vehicle systems 100. For example, the communication systems 112, 114 can communicate the image data as the image data is being acquired so that the management system 102 can view the image data in near real time (e.g., relatively shortly after the image data is acquired), or at a later time. The management system 102 can recall image data of local conditions at or near the vehicle systems 100 by specifying specific dates, times, and/or locations on demand.

The image data that has the operational data matching the search parameters can be presented to an operator of the management system 102 on the display device 124 with the operating data overlaid on the image data. This can allow the operator to review or to assess the conditions existing at the specified operational data used to search for the image data (e.g., the date, time, and/or location of interest). In one aspect, the management system 102 can obtain multiple different sets of image data acquired by multiple different imaging systems 200 on different vehicle systems 100. An operator at the management system 102 can then use a location in a transportation network (e.g., formed by two or more roads, tracks, or the like) in which different vehicle systems 100 are traveling and/or previously traveled while acquiring image data. The operator-specified location can then be used by the management system 102 to search through the image data acquired by the different imaging systems 200 of the different vehicle systems 100. The management system 102 can find the matching image data acquired at or near (e.g., within a designated distance threshold) the operator-specified location using the operational data embedded in or otherwise associated with the image data. The operator optionally can limit this matching image data by specifying other operational data, such as a time and/or date when the image data was acquired, throttle settings used when the image data was acquired, brake settings used when the image data was acquired, and the like. The matching image data that is found by the management system 102 and then presented to the operator can then include the image data representative of the operator-specified location.

Figure 3:
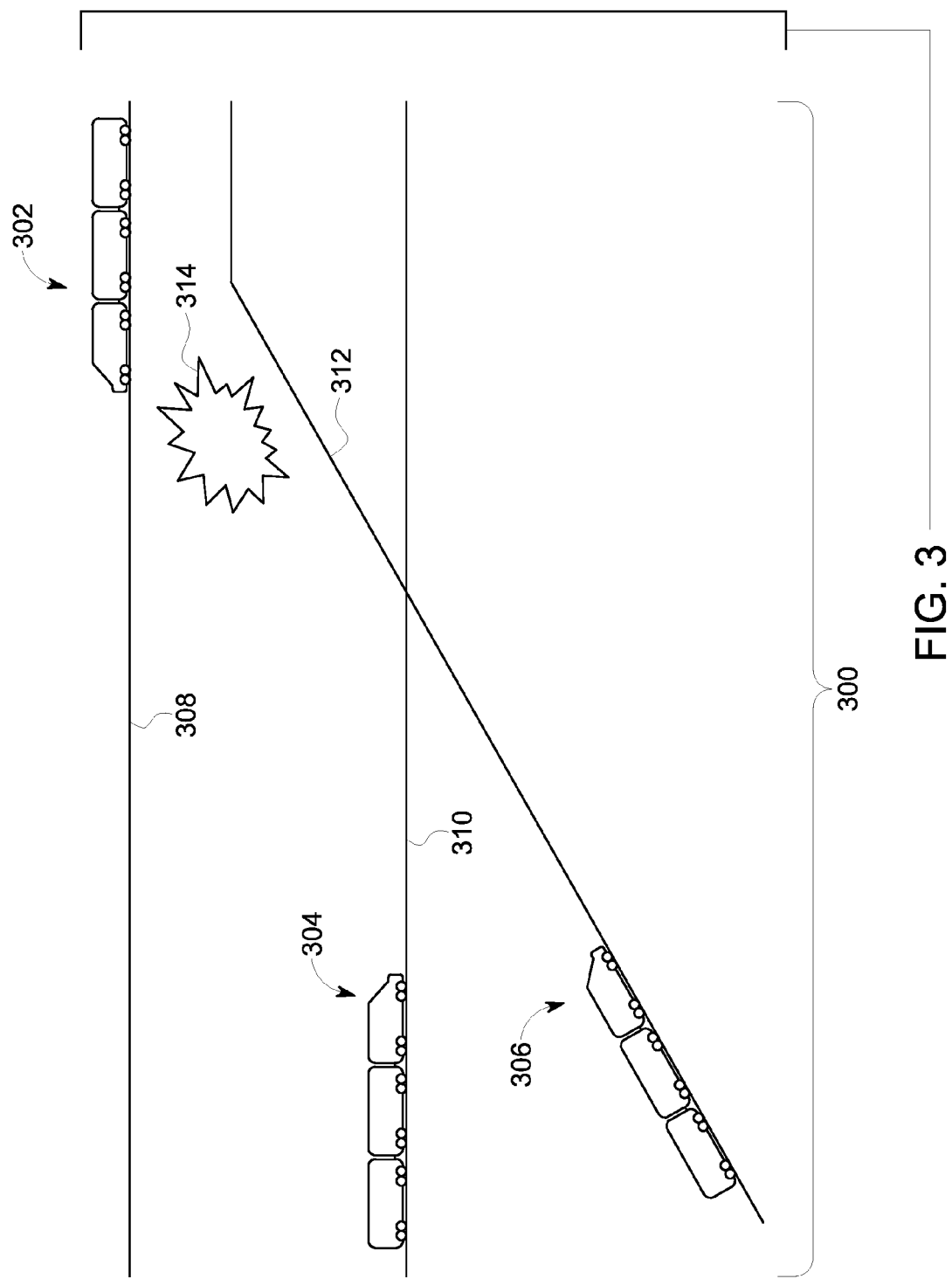
FIG. 3 is a schematic illustration of a transportation network in accordance with one example of the inventive subject matter described herein.

FIG. 3 is a schematic illustration of a transportation network 300 in accordance with one example of the inventive subject matter described herein. The network 300 includes multiple routes 308, 310, 312 over which vehicle systems 302, 304, 306 can travel. The number and/or arrangement of the routes in the network 300 may vary from those shown in FIG. 3. Each of the vehicle systems 302, 304, 306 may represent a different one of the vehicle system 100 shown in FIG. 1.

During travel of the vehicle systems 302, 304, 306, the imaging systems 200 (shown in FIG. 2) of these vehicle systems 302, 304, 306 can generate image data that is saved with operational data embedded in or otherwise associated with the image data, as described above. An operator at the management system 102 (shown in FIG. 1) may desire to see the image data acquired by these imaging systems 200 when the vehicle systems 302, 304, 306 were at or near the location of a location of interest 314. This location of interest 314 can be a previously identified foreign object at or near the routes (e.g., a downed tree, rock slide, or the like), a wayside device (e.g., a signal, inspection device, or the like) that may be broken or otherwise in need of repair, a potentially damaged section of the routes, or another event. For example, an operator onboard one or more vehicle systems may notify the management system 102 or operator at the management system 102 of a potential problem or issue at the location of the location of interest 314.

The operator at the management system 102 can then enter the location of the location of interest 314 and/or temporal ranges (e.g., times and/or dates during which the location of interest 314 may have occurred) as search parameters for the image data. Optionally, other search parameters can be used. The management system 102 can then search the image data previously and/or currently acquired by the imaging systems 200 of the vehicle systems 302, 304, 306 to find the image data stored onboard the vehicle systems 302, 304, 306 that was acquired at or near the location of interest 314.

The segments of the image data acquired at or near the location of interest 314 can be communicated from the vehicle systems 302, 304, 306 (or from another location) to the management system 102. These segments of the image data can be presented to the operator so that the operator is able to view the image data obtained at or near the location of interest 314 in order to examine the location of interest 314.

In one aspect, the management system 102 can filter the image data by providing the operator with the segments of the image data that were acquired at or near the location of interest 314, and by not providing the operator with the image data that was not acquired at or near the location of interest 314.

Figure 4:
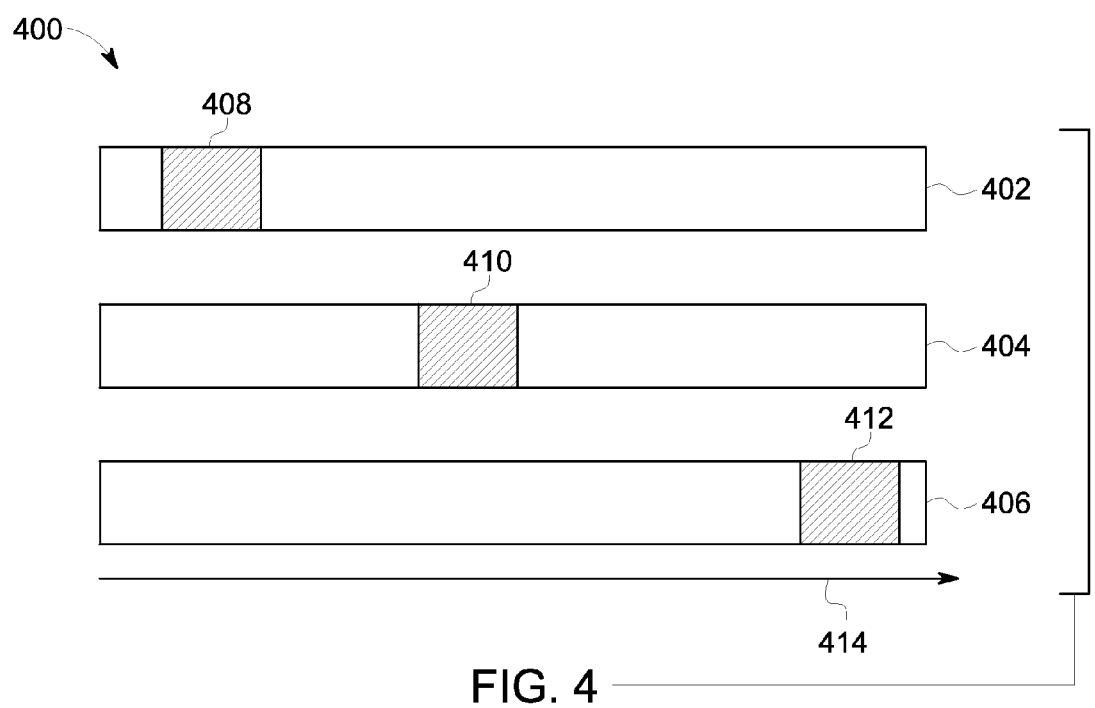
FIG. 4 illustrates a timeline representation of image data provided by the imaging systems shown in FIG. 2 disposed onboard the vehicle systems shown in FIG. 3 according to one example of the inventive subject matter described herein.

FIG. 4 illustrates a timeline representation 400 of image data 402, 404, 406 provided by the imaging systems 200

(shown in FIG. 2) disposed onboard the vehicle systems 302, 304, 306 (shown in FIG. 3) according to one example of the inventive subject matter described herein. The image data 402, 404, 406 are shown alongside a horizontal axis 414 representative of time. The image data 402, 404, 406 includes segments of interest 408, 410, 412. These segments of interest 408, 410, 412 represent the portions of the image data 402, 404, 406 that match or otherwise correspond to the search parameters used by the management system 102 (shown in FIG. 1) to find matching image data.

For example, the segment of interest 408 of the image data 402 can represent the portion of the image data 402 acquired at or near the location of interest 314 (shown in FIG. 3) when the vehicle system 302 moved by the location of interest 314. The segment of interest 410 of the image data 404 can represent the portion of the image data 404 acquired at or near the location of interest 314 when the vehicle system 304 moved by the location of interest 314. In this example, because the vehicle system 304 drove past the location of interest 314 after the vehicle system 304, the segment of interest 410 in the image data 404 from the vehicle system 304 occurs later than the segment of interest 408 in the image data 402 from the vehicle system 302. Similarly, the segment of interest 412 of the image data 406 can represent the portion of the image data 406 acquired at or near the location of interest 314 when the vehicle system 306 moved by the location of interest 314.

In one embodiment, instead of providing all of the image data 402, 404, 406 to an operator when the management system 102 searches for image data acquired at or near the location of interest 314, the management system 102 may only provide the segments of interest 408, 410, 412 to the operator. In doing so, the operator may be able to more efficiently review the portions of the image data that are relevant to the location of interest 314. Alternatively, a greater amount of the image data may be provided to the operator.

Optionally, the search parameters provided by an operator can include a camera perspective or field of view. As described above, different cameras of an imaging system may have different fields of view. The field of view may be stored as operational data with the image data that is acquired for that field of view. The operator can select one or more fields of view as searching parameters, and the management system can search through the image data from one or more imaging systems to find matching image data for presentation to the operator (e.g., image data of the selected field of view).

Figure 5:
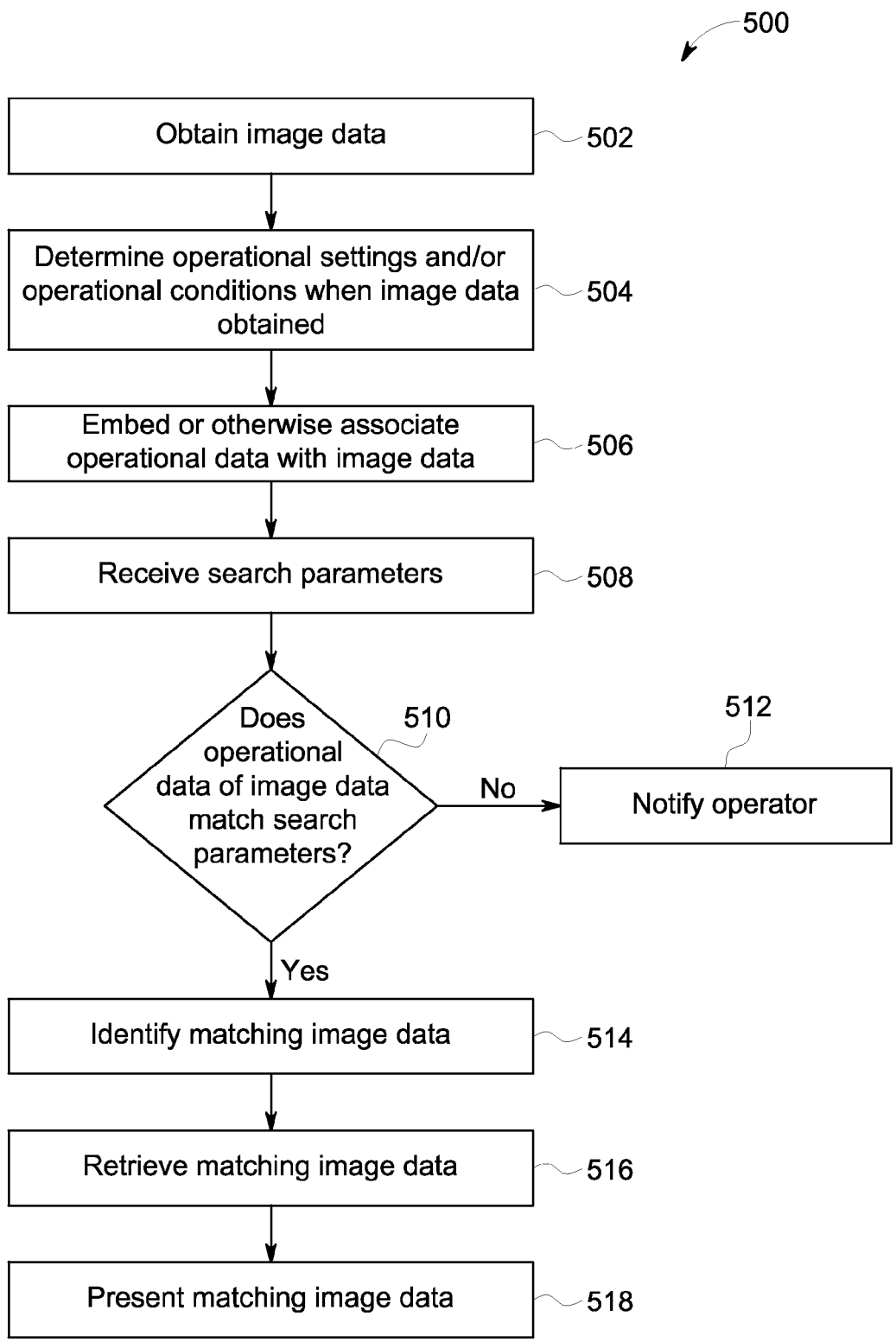
FIG. 5 illustrates a flowchart of a method for managing image data according to one example of the inventive subject matter described herein.

FIG. 5 illustrates a flowchart of a method 500 for managing image data according to one example of the inventive subject matter described herein. The method 500 may be practiced by the management system 102 (shown in FIG. 1) and/or imaging system 100 (shown in FIG. 1) in one embodiment. At 502, image data is obtained. For example, one or more cameras of vehicle systems can generate image data representative of imaged objects and events in the fields of view of the cameras as the vehicle systems move, as described above.

At 504, operational settings and/or operational conditions of the vehicle system are determined. These settings and/or conditions are referred to as operational data, as described above. The operational data at the same times that the image data was acquired is determined. For example, the location, time, date, speed, throttle settings, brake settings, vibrations, wheel slip, and the like, of the vehicle system at the same time that the image data is obtained is determined.

At 506, the operational data is embedded or otherwise associated with the image data. The operational data can be saved in the same electronic file as the image data, and/or in another location while being associated with the image data. For example, different segments of the image data can be embedded with the different locations, times, dates, and the like, of the vehicle system when the different segments of the image data were obtained.

At 508, search parameters are received, such as from an operator of the management system. The search parameters can include operational data, ranges of operational data, or the like, for which the operator wants to find corresponding image data. For example, the search parameters can include locations when the operator wants to find image data acquired at or near the specified locations, times when the operator wants to find image data acquired at or during the specified times, brake settings when the operator wants to find image data acquired when those brake settings were being applied, or the like.

At 510, the operational data of the image data acquired by imaging systems onboard one or more vehicle systems is examined to determine if the operational data matches or otherwise corresponds to the search parameters. For example, the management system can examine the operational data of the acquired image data to determine if any image data was acquired at the locations or times specified by the operator, or when the brake settings specified by the operator were being applied.

If at least some image data includes or is associated with operational data that matches the search parameters (or that more closely matches the search parameters more than other operational data of the image data), then the image data can be identified as matching image data for presentation to the operator. As a result, flow of the method 500 can proceed to 514.

On the other hand, if the image data does not include operational data that matches the search parameters (or does not more closely match the search parameters more than other operational data of the image data), then no image data may be identified as matching image. As a result, flow of the method 500 can proceed to 512.

At 512, a notification is communicated to the operator that little or no image data has been acquired that includes or is associated with the search parameters. This notification can be an audible, textual, or other notification communicated to the operator. In response, the operator may specify different search parameters to find other image data.

At 514, the matching image data is identified. For example, the location of where the matching image data is stored may be determined. The image data may be stored onboard one or more vehicle systems or other locations that are remote (e.g., not in the same building, town, county, or the like) from the management system. The management system may remotely search the image data by sending request signals to the imaging systems of the vehicle systems, with the request signals identifying the search parameters. The imaging systems (e.g., the controllers of the imaging systems) can review the image data stored onboard the vehicle systems to find the matching image data.

At 516, the matching image data is sent from the imaging systems to the management system. For example, the remotely stored image data can be transmitted and/or broadcast by the communication systems of the vehicle systems to the management system in response to receiving the search parameters and finding the matching image data.

At 518, the matching image data is presented to the operator of the management system. The matching image data is received from the vehicle systems and can be shown on a display device to the operator.

Figure 6:
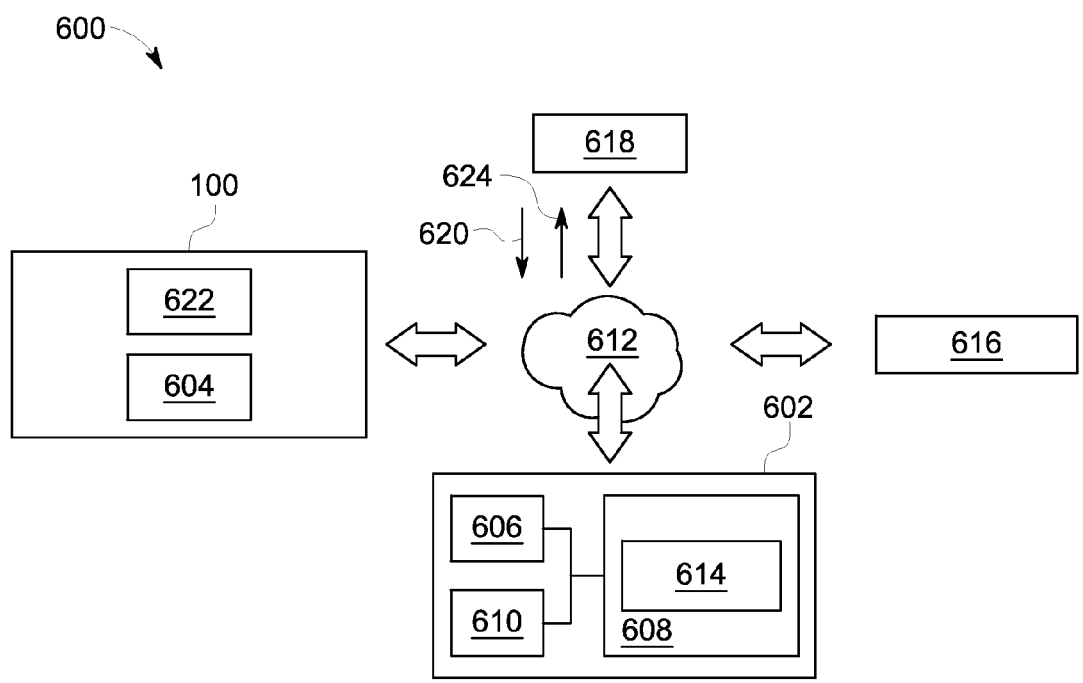
FIG. 6 illustrates another embodiment of a vehicle system and a vehicle image data management system.

FIG. 6 illustrates another embodiment of a vehicle image data management system 600. Aspects of the system 600 may be similar to those of the system 102 described elsewhere herein, but the system 600 is network-based, in whole or in part. More specifically, the system 600 comprises at least one server unit 602. In other embodiments, the system 600 additionally comprises at least one client unit 604. The server unit 602 comprises a computer or other electronic device, which may include one or more processors 606, a memory 608, and a communication module 610. The communication module 610 is an electronic device or system that is configured for communicating over a network 612, e.g., the Internet. For example, the communication module may include a router and a modem. The memory 608 comprises a non-transitory, tangible, computer-readable storage medium, such as a hard disk, solid state drive, non-volatile memory, or the like. The server unit 602 is configured to implement a network-accessible website 614, which is stored in the memory 608 as program code (e.g., as HTML code). The website 614 includes one or more webpages that are in effect remotely accessible by an operator terminal 618 (e.g., remote computer). The website 614 may include security functionality (e.g., account- and password-based access, or account- and hardware token-based access), and provides a network-based user interface for an operator of the operator terminal 618 to input search parameters 620 to search for remote image data 622 associated with (e.g., stored on) one or more vehicle systems 100. For example, the search parameters may specify at least one of operational data or a range of the operational data of the one or more vehicle systems.

The one or more vehicle systems 100 may be configured in any of the following manners (the vehicle systems may all be configured the same, or there may be a mix of different configurations): (i) the vehicle system is configured generally as shown and described in regards to FIG. 2, for direct (non-network) communications with the server unit 602; (ii) the vehicle system is configured generally as shown and described in regards to FIG. 2, for direct communications with an off-board system (e.g., as shown in FIG. 1) that is in turn configured to communicate with the server unit 602 through the network 612; and/or (iii) the vehicle system is configured to communicate with the server unit 602 through the network 612 (e.g., the vehicle system includes a communication unit, such as a wireless LAN or WAN modem, for wirelessly or otherwise communicating over the Internet or other network 612). In the latter case, the vehicle system may be outfitted with the client unit 604. The client unit 604 may comprise one or more electronic devices and/or program code, stored in a tangible, non-transitory computer-readable storage medium, which are configured to control communications between the vehicle system and the server unit 602 for one or more functions of the system 600.

The server unit 602 is configured, in operation, to receive the search parameters 620, which specify operational data and/or a range of the operational data of one or more vehicle systems 100. For example, as noted above, the search parameters 620 may be received as data over the network 612, by way of an operator entering, selecting, etc. the search parameters 620 on the website 614 displayed on the remote operator terminal 618. The server unit 602 is further configured to search remotely stored image data 622 (e.g., stored on the one or more vehicle systems 100) based on the search parameters to identify matching image data 624 (data of the stored image data that matches the search parameter (s)). The server unit 602 is further configured to obtain the matching image data having the operational data specified by the search parameters. In embodiments, remotely searching and obtaining the matching image data is carried out by the server unit 602 in communication with the client unit 604 on board the one or more vehicle systems. For example, the client unit 604 may be configured to authenticate communications from the server unit 602, and to process commands received from the server unit 602 for searching the image data 622 and/or communicating the matching image data (or information relating thereto) to the server unit 602.

The server unit 602 is further configured to present the matching image data 624 to an operator. For example, the matching image data 624 may be displayed on the website 614, and/or available for download on the website 614; the website 614 is displayed and operable on the operator's remote terminal 618.

In embodiments, the website 614 is hosted on a third-party server 602, with the service provider and/or operator of the website (i.e., entity that controls and/or owns the website and related functionality) accessing the website (for servicing, updating, etc.) from a remote terminal 616 via the network 612.

In one embodiment, a system (e.g., an image management system) includes a controller and one or more analysis processors. The controller is configured to receive search parameters, the search parameters specifying at least one of operational data or a range of the operational data of one or more vehicle systems. The one or more analysis processors are configured to search remotely stored image data based on the search parameters to identify matching image data. The remotely stored image data is obtained by one or more imaging systems disposed onboard the one or more vehicle systems. The remotely stored image data is associated with the operational data of the one or more vehicle systems that was current when the remotely stored image data was acquired. The one or more analysis processors also are configured to obtain the matching image data having the operational data specified by the search parameters and to present the matching image data to an operator.

In one aspect, the remotely stored image data is remotely stored onboard one or more vehicles of the one or more vehicle systems that do not include the one or more analysis processors.

In one aspect, the controller and one or more analysis processors are located off board the one or more vehicle systems at an off-board facility.

In one aspect, the remotely stored image data is embedded with the operational data that was current for the one or more vehicle systems when the remotely stored image data was acquired.

In one aspect, the operational data includes operational settings of the one or more vehicle systems that are used to control operations of the one or more vehicle systems.

In one aspect, the operational data includes operational conditions to which the one or more vehicle systems were exposed when the remotely stored image data was acquired.

In one aspect, the operational data includes at least one of locations of the one or more vehicle systems when different segments of the remotely stored image data were acquired, times at which the different segments of the remotely stored image data were acquired, and/or dates on which the different segments of the remotely stored image data were acquired.

In one aspect, the controller is configured to receive at least one of an operator specified location, an operator specified time, an operator specified range of times, an operator specified date, and/or an operator specified range of dates as the search parameters. The one or more analysis processors can be configured to search the operational data associated with the remotely stored image data to select one or more segments of the remotely stored image data that were acquired at the at least one of the operator specified location, the operator specified time, the operator specified range of times, the operator specified date, and/or the operator specified range of dates as the matching image data.

In one aspect, the one or more analysis processors are configured to identify the matching image data by determining which of the remotely stored image data are associated with the operational data that matches or more closely matches the search parameters more than other remotely stored image data.

In another embodiment, a method (e.g., an image management method) includes receiving search parameters that specify at least one of operational data or a range of the operational data of one or more vehicle systems and searching (with one or more processors) remotely stored image data based on the search parameters to identify matching image data. The remotely stored image data can be obtained by one or more imaging systems disposed onboard the one or more vehicle systems, and can be associated with the operational data of the one or more vehicle systems that was current when the remotely stored image data was acquired. The method also can include obtaining the matching image data having the operational data specified by the search parameters to present the matching image data to an operator.

In one aspect, the remotely stored image data is remotely stored from the one or more processors.

In one aspect, the remotely stored image data is searched by examining the operational data that is embedded in the remotely stored image data and that was current for the one or more vehicle systems when the remotely stored image data was acquired.

In one aspect, the operational data includes operational settings of the one or more vehicle systems that are used to control operations of the one or more vehicle systems.

In one aspect, the operational data includes operational conditions to which the one or more vehicle systems were exposed when the remotely stored image data was acquired.

In one aspect, the operational data includes at least one of locations of the one or more vehicle systems when different segments of the remotely stored image data were acquired, times at which the different segments of the remotely stored image data were acquired, and/or dates on which the different segments of the remotely stored image data were acquired.

In one aspect, the search parameters that are received include at least one of an operator specified location, an operator specified time, an operator specified range of times, an operator specified date, and/or an operator specified range of dates.

In one aspect, the remotely stored image data is searched by examining the operational data associated with the remotely stored image data to select one or more segments of the image data that were acquired at the at least one of the operator specified location, the operator specified time, the operator specified range of times, the operator specified date, and/or the operator specified range of dates as the matching image data.

In one aspect, the matching image data is identified by determining which of the matching image data are associated with the operational data that matches or more closely matches the search parameters more than other matching image data.

In another embodiment, another method (e.g., another image management method) includes acquiring first image data from one or more cameras disposed onboard a vehicle system as the vehicle system moves along a route. The image data represents at least one of images or videos of a field of view of the one or more cameras. The method also may include determining operational data of the vehicle system when the first image data was acquired. The operational data includes at least one of operational settings of the vehicle system when the first image data was acquired and/or operational conditions to which the vehicle system is exposed when the first image data was acquired. The method also can include associating the operational data with the first image data, identifying one or more segments of the first image data as matching image data responsive to receiving search parameters that specify at least some of the operational data associated with the first image data, and communicating the matching image data to an off-board location responsive to identifying the matching image data.

In one aspect, the operational data can be associated with the first image data by embedding the operational data in the first image data in a memory device disposed onboard the vehicle system.

In one aspect, the operational data includes at least one of locations of the vehicle system when the first image data was acquired, times at which the first image data was acquired, and/or dates on which the first image data was acquired.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
  a controller configured to receive search parameters, the search parameters specifying at least one of operational data or a range of the operational data of one or more vehicle systems; and
  one or more analysis processors configured to search remotely stored image data in a memory of the one or more vehicle systems based on the search parameters to identify matching image data, the remotely stored image data obtained by one or more imaging systems disposed onboard the one or more vehicle systems and stored in the memory of the one or more vehicle systems, the remotely stored image data associated with the operational data of the one or more vehicle systems that was current when the remotely stored image data was acquired, wherein the one or more analysis processors also are configured to obtain the matching image data having the operational data specified by the search parameters and to present the matching image data to an operator.

2. The system of claim 1, wherein the remotely stored image data is remotely stored onboard one or more vehicles of the one or more vehicle systems that do not include the one or more analysis processors.

3. The system of claim 1, wherein the controller and one or more analysis processors are located off board the one or more vehicle systems at an off-board facility.

4. The system of claim 1, wherein the remotely stored image data is embedded with the operational data that was current for the one or more vehicle systems when the remotely stored image data was acquired.

5. The system of claim 1, wherein the operational data includes one or more throttle settings, brake settings, amounts of fuel carried by the one or more vehicle systems, or amounts of electric energy stored onboard the one or more vehicle systems.

6. The system of claim 1, wherein the operational data includes operational conditions to which the one or more vehicle systems were exposed when the remotely stored image data was acquired.

7. The system of claim 1, wherein the operational data includes at least one of locations of the one or more vehicle systems when different segments of the remotely stored image data were acquired, times at which the different segments of the remotely stored image data were acquired, or dates on which the different segments of the remotely stored image data were acquired.

8. The system of claim 1, wherein the controller is configured to receive at least one of an operator specified location, an operator specified time, an operator specified range of times, an operator specified date, or an operator specified range of dates as the search parameters, and the one or more analysis processors are configured to search the operational data associated with the remotely stored image data to select one or more segments of the remotely stored image data that were acquired at the at least one of the operator specified location, the operator specified time, the operator specified range of times, the operator specified date, or the operator specified range of dates as the matching image data.

9. The system of claim 1, wherein the one or more analysis processors are configured to identify the matching image data by determining which of the remotely stored image data are associated with the operational data that matches or more closely matches the search parameters more than other remotely stored image data.

10. A method comprising:
  receiving search parameters that specify at least one of operational data or a range of the operational data of one or more vehicle systems;
  searching, with one or more processors, remotely stored image data in a memory of the one or more vehicle systems based on the search parameters to identify matching image data, the remotely stored image data obtained by one or more imaging systems disposed onboard the one or more vehicle systems and stored in the memory of the one or more vehicle systems, the remotely stored image data associated with the operational data of the one or more vehicle systems that was current when the remotely stored image data was acquired; and
  obtaining the matching image data having the operational data specified by the search parameters to present the matching image data to an operator.

11. The method of claim 10, wherein the remotely stored image data is remotely stored from the one or more processors.

12. The method of claim 10, wherein the remotely stored image data is searched by examining the operational data that is embedded in the remotely stored image data and that was current for the one or more vehicle systems when the remotely stored image data was acquired.

13. The method of claim 10, wherein the operational data includes one or more throttle settings, brake settings, amounts of fuel carried by the one or more vehicle systems, or amounts of electric energy stored onboard the one or more vehicle systems.

14. The method of claim 10, wherein the operational data includes operational conditions to which the one or more vehicle systems were exposed when the remotely stored image data was acquired.

15. The method of claim 10, wherein the operational data includes at least one of locations of the one or more vehicle systems when different segments of the remotely stored image data were acquired, times at which the different segments of the remotely stored image data were acquired, or dates on which the different segments of the remotely stored image data were acquired.

16. The method of claim 10, wherein the search parameters that are received include at least one of an operator specified location, an operator specified time, an operator specified range of times, an operator specified date, or an operator specified range of dates.

17. The method of claim 16, wherein the remotely stored image data is searched by examining the operational data associated with the remotely stored image data to select one or more segments of the image data that were acquired at the at least one of the operator specified location, the operator specified time, the operator specified range of times, the operator specified date, or the operator specified range of dates as the matching image data.

18. The method of claim 10, wherein the matching image data is identified by determining which of the matching image data are associated with the operational data that matches or more closely matches the search parameters more than other matching image data.

19. The system of claim 1, wherein the one or more image analysis processors are configured to receive the search parameters that are associated with one or more of a location or a time of an accident involving at least one of the vehicle systems,
   wherein the one or more image analysis processors also are configured to obtain the remotely stored image data that was obtained at the one or more of the location or the time of the accident from a camera disposed onboard the one or more vehicle systems.

20. The system of claim 1, wherein the operational data is separate from the image data, and wherein the operational data includes neither images nor video associated with the one or more vehicle systems.

21. The method of claim 10, wherein the search parameters that are received are associated with one or more of a location or a time of an accident involving at least one of the vehicle systems, and
   wherein searching the remotely stored image data includes obtaining the remotely stored image data that was obtained at the one or more of the location or the time of the accident from a camera disposed onboard the one or more vehicle systems.

* * * * *